United States Patent
Asada

(10) Patent No.: US 12,071,133 B2
(45) Date of Patent: Aug. 27, 2024

(54) VEHICLE BODY SPEED ESTIMATION METHOD AND VEHICLE BODY SPEED ESTIMATION APPARATUS

(71) Applicants: TOYOTA JIDOSHA KABUSHIKI KAISHA, Toyota (JP); ADVICS CO., LTD., Kariya (JP)

(72) Inventor: Hiroshi Asada, Takahama (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 163 days.

(21) Appl. No.: 17/751,805

(22) Filed: May 24, 2022

(65) Prior Publication Data

US 2022/0388513 A1    Dec. 8, 2022

(30) Foreign Application Priority Data

Jun. 2, 2021   (JP) .................... 2021-093199

(51) Int. Cl.
*B60W 30/18*    (2012.01)
*B60W 40/101*    (2012.01)
*B60W 40/107*    (2012.01)

(52) U.S. Cl.
CPC .... *B60W 30/18109* (2013.01); *B60W 40/101* (2013.01); *B60W 40/107* (2013.01)

(58) Field of Classification Search
CPC ......... B60W 30/18109; B60W 40/101; B60W 40/107
See application file for complete search history.

(56) References Cited

U.S. PATENT DOCUMENTS

| | | | | |
|---|---|---|---|---|
| 5,701,247 A | * | 12/1997 | Sasaki | B60K 23/0808 701/1 |
| 8,510,011 B2 | * | 8/2013 | Inoue | B60W 10/06 477/34 |
| 2003/0036837 A1 | | 2/2003 | Katayama et al. | |
| 2019/0344796 A1 | | 11/2019 | Ian et al. | |
| 2020/0108816 A1 | | 4/2020 | Velazquez Alcantar et al. | |

FOREIGN PATENT DOCUMENTS

| | | |
|---|---|---|
| EP | 0314453 A2 | 7/1993 |
| JP | H05-185922 A | 7/1993 |
| JP | 2003-002079 A | 1/2003 |
| JP | 2016-103867 A | 6/2016 |

* cited by examiner

*Primary Examiner* — Jaime Figueroa
*Assistant Examiner* — Jamal A Shah
(74) *Attorney, Agent, or Firm* — Dinsmore & Shohl LLP

(57) ABSTRACT

A vehicle body speed estimation method applied to a four-wheel drive vehicle includes: acquiring an estimated vehicle body speed based on wheel speeds or a longitudinal acceleration of the vehicle; determining whether an operation condition that includes at least a condition that the estimated vehicle body speed is higher than an operation determination speed is satisfied; performing torque limitation to reduce a torque of a portion of wheels of the vehicle when the operation condition is satisfied; determining whether a stop condition that includes a condition that the estimated vehicle body speed is lower than or equal to a stop determination speed or a condition that a duration of a state where a wheel acceleration of the portion of the wheels is higher than zero is longer than or equal to a set period of time; and stopping the torque limitation when the stop condition is satisfied.

10 Claims, 10 Drawing Sheets

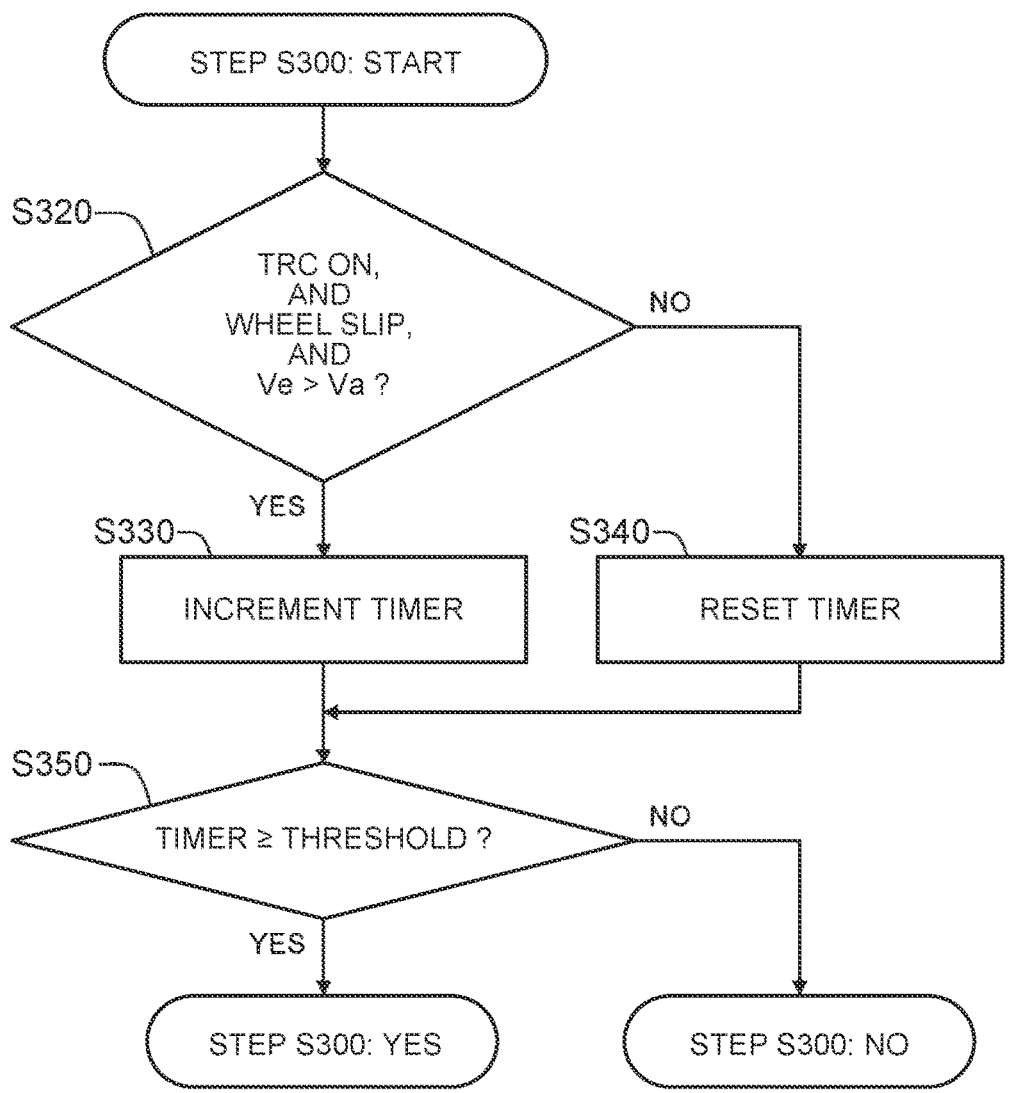

VEHICLE BODY SPEED ESTIMATION METHOD AND VEHICLE BODY SPEED ESTIMATION APPARATUS

CROSS-REFERENCE TO RELATED APPLICATION

This application claims priority to Japanese Patent Application No. 2021-093199 filed on Jun. 2, 2021, incorporated herein by reference in its entirety.

BACKGROUND

1. Technical Field

The disclosure relates to a vehicle body speed estimation method and a vehicle body speed estimation apparatus.

2. Description of Related Art

Japanese Unexamined Patent Application Publication No. 2003-002079 (JP 2003-002079 A) describes a driving force controller for a four-wheel drive vehicle. The four-wheel drive vehicle includes a friction clutch provided in the middle of an engine drive-train to rear wheels. The driving force controller variably controls the driving force distribution ratio between front wheels and the rear wheels by controlling the clutch engagement force of the friction clutch. The driving force controller detects an acceleration slip of the wheels and executes traction control for reducing the driving force of drive wheels.

Japanese Unexamined Patent Application Publication No. 05-185922 (JP 05-185922 A) describes a method of calculating an estimated vehicle body speed. In a state where no excessive slip or spin is occurring in wheels, the estimated vehicle body speed is calculated from wheel speeds. On the other hand, when an excessive slip or spin is occurring in the wheels, the estimated vehicle body speed is calculated based on an output of a gravity accelerometer.

Japanese Unexamined Patent Application Publication No. 2016-103867 (JP 2016-103867 A) describes a vehicle body speed estimation apparatus for a vehicle. The vehicle includes a braking and driving force generator capable of generating a driving force and a braking force applied to all the wheels. The vehicle body speed estimation apparatus estimates a vehicle body speed from the wheel speeds of the wheels. The estimated vehicle body speed is used in traction control and anti-lock brake control.

SUMMARY

Estimating the vehicle body speed of a four-wheel drive vehicle will be considered. When, for example, all the four wheels are in a slip, an estimated vehicle body speed that is estimated based on wheel speeds is higher than an actual vehicle body speed. In other words, an apparent increase of the estimated vehicle body speed occurs. Such a deviation of an estimated vehicle body speed from an actual vehicle body speed leads to a decrease in the accuracy of vehicle control or information processing using the estimated vehicle body speed.

The disclosure provides a vehicle body speed estimation method and a vehicle body speed estimation apparatus for ensuring the accuracy of an estimated vehicle body speed of a four-wheel drive vehicle.

A first aspect relates to a vehicle body speed estimation method applied to a four-wheel drive vehicle. The vehicle body speed estimation method includes: acquiring an estimated vehicle body speed based on wheel speeds or a longitudinal acceleration of the vehicle; determining whether an operation condition that includes at least a condition that the estimated vehicle body speed is higher than an operation determination speed is satisfied; performing torque limitation to reduce a torque of a portion of wheels of the vehicle when the operation condition is satisfied; determining whether a stop condition that includes a condition that the estimated vehicle body speed is lower than or equal to a stop determination speed or a condition that a duration of a state where a wheel acceleration of the portion of the wheels is higher than zero is longer than or equal to a set period of time; and stopping the torque limitation when the stop condition is satisfied.

A second aspect relates to a vehicle body speed estimation apparatus applied to a four-wheel drive vehicle. The vehicle body speed estimation apparatus includes one or plurality of processors. The one or plurality of processors is programmed to acquire an estimated vehicle body speed based on wheel speeds or a longitudinal acceleration of the vehicle; determine whether an operation condition that includes at least a condition that the estimated vehicle body speed is higher than an operation determination speed is satisfied; perform torque limitation to reduce a torque of a portion of wheels of the vehicle when the operation condition is satisfied; determine whether a stop condition that includes a condition that the estimated vehicle body speed is lower than or equal to a stop determination speed or a condition that a duration of a state where a wheel acceleration of the portion of the wheels is higher than zero is longer than or equal to a set period of time; and stop the torque limitation when the stop condition is satisfied.

In the first aspect, the torque limitation may reduce the torque of rear wheels without reducing the torque of front wheels.

In the first aspect, the operation determination speed may be calculated based on an integral of the longitudinal acceleration.

In the first aspect, the stop determination speed may be calculated based on an integral of the longitudinal acceleration.

In the first aspect, the stop determination speed may be the sum of a set value and a value calculated based on the integral of the longitudinal acceleration.

In the first aspect, the estimated vehicle body speed may be a first estimated vehicle body speed that is estimated based on the wheel speeds.

In the first aspect, the estimated vehicle body speed may be a second estimated vehicle body speed that is estimated based on an integral of the sum of the longitudinal acceleration and an offset.

In the first aspect, the vehicle body speed estimation method may further include acquiring a first estimated vehicle body speed based on the wheel speeds; calculating a second estimated vehicle body speed based on an integral of the sum of the longitudinal acceleration and an offset; determining whether a slip determination condition that includes at least a condition that the first estimated vehicle body speed is higher than the second estimated vehicle body speed is satisfied; setting the first estimated vehicle body speed for the estimated vehicle body speed when the slip determination condition is not satisfied; and setting the second estimated vehicle body speed for the estimated vehicle body speed when the slip determination condition is not satisfied.

In the first and second aspects, the vehicle body speed estimation method or the one or plurality of processors of the vehicle body speed estimation apparatus may further include determining whether a wheel slip is occurring, and the operation condition may include at least a condition that the wheel slip is occurring and a condition that the estimated vehicle body speed is higher than the operation determination speed.

In the first and second aspects, the operation condition may include a condition that the wheel slip occurs and a duration of a state where the estimated vehicle body speed is higher than the operation determination speed is longer than or equal to a set period of time.

In the first and second aspects, the determining whether the wheel slip is occurring may include: acquiring a first estimated vehicle body speed based on the wheel speeds; calculating a second estimated vehicle body speed based on an integral of the sum of the longitudinal acceleration and an offset; determining whether a slip determination condition that includes at least a condition that the first estimated vehicle body speed is higher than the second estimated vehicle body speed is satisfied; and determining that the wheel slip is occurring when the slip determination condition is satisfied.

According to the aspects of the disclosure, an estimated vehicle body speed is acquired based on wheel speeds or a longitudinal acceleration. When an operation condition that includes at least a condition that the estimated vehicle body speed is higher than an operation determination speed is satisfied, torque limitation to reduce a torque of a portion of wheels is performed. After that, when a stop condition is satisfied, the torque limitation stops. With such torque limitation, an apparent increase of the estimated vehicle body speed is eliminated, and the accuracy of the estimated vehicle body speed is recovered. In other words, the accuracy of the estimated vehicle body speed is ensured.

According to the aspects of the disclosure, there is a stop condition of torque limitation, so continuation of torque limitation more than necessary is suppressed. As a result, a stall of the vehicle is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a flowchart for illustrating a fourth example of the operation condition of torque limitation;

FIG. 10 is a conceptual view for illustrating examples of limit torques at the time when torque limitation is performed;

DETAILED DESCRIPTION OF EMBODIMENTS

Embodiments of the disclosure will be described with reference to the accompanying drawings.

Figure 1:
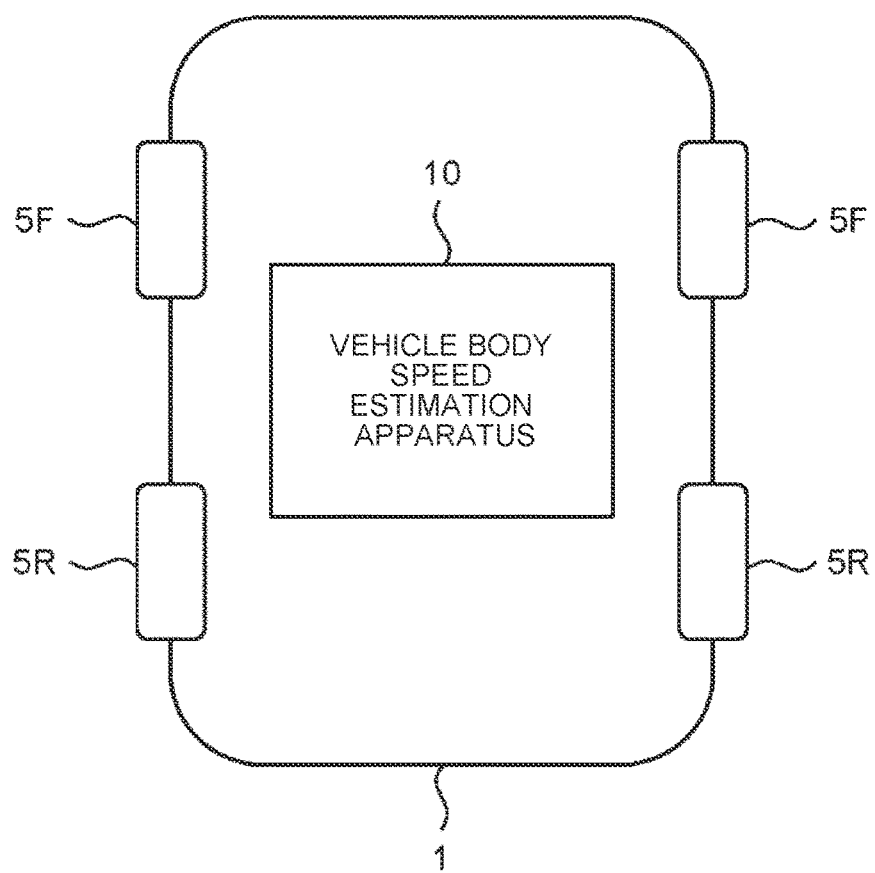
FIG. 1 is a conceptual view for illustrating the outline of a vehicle and a vehicle body speed estimation apparatus according to a first embodiment.

1. First Embodiment 1-1. Outline of Vehicle and Vehicle Body Speed Estimation Apparatus FIG. 1 is a conceptual view for illustrating the outline of a vehicle 1 and a vehicle body speed estimation apparatus 10 according to a first embodiment. The vehicle 1 includes a plurality of wheels 5. The wheels 5 include front wheels 5F and rear wheels 5R. In the present embodiment, the vehicle 1 is configured to be able to run in four-wheel drive. In other words, the vehicle 1 is configured to be capable of driving the front wheels 5F and the rear wheels 5R. Typically, the vehicle 1 is capable of driving the front wheels 5F and the rear wheels 5R independently of each other.

The vehicle body speed estimation apparatus 10 estimates the vehicle body speed of the vehicle 1. A vehicle body speed estimated is, hereinafter, referred to as "estimated vehicle body speed Ve". The estimated vehicle body speed Ve is estimated based on a vehicle status detected by sensors mounted on the vehicle 1. Examples of the vehicle status of the vehicle 1 include wheel speeds and a longitudinal acceleration. Typically, the vehicle body speed estimation apparatus 10 is mounted on the vehicle 1 and acquires the estimated vehicle body speed Ve based on the vehicle status detected by the sensors. As another example, the vehicle body speed estimation apparatus 10 may be disposed in a distributed manner in the vehicle 1 and an external system.

The estimated vehicle body speed Ve can be used in various vehicle control and information processing. To accurately perform vehicle control or information processing, it is required to acquire a high-accuracy estimated vehicle body speed Ve.

For example, the estimated vehicle body speed Ve is used in traction control over the vehicle 1. Traction control (hereinafter, which may be abbreviated as "TRC") is vehicle running control for reducing a spin of the wheels 5 (drive wheels) at the start or acceleration of the vehicle 1. More specifically, a slip ratio of each wheel 5 is calculated based on the wheel speed of the wheel 5 and the estimated vehicle body speed Ve. When the slip ratio of any one of the wheels 5 exceeds a threshold, TRC is activated. The wheel 5 of which the slip ratio exceeds the threshold is, hereinafter, referred to as "TRC target wheel 5t". TRC reduces the torque of the TRC target wheel 5t such that the slip ratio of the TRC target wheel 5t decreases to a target slip ratio. An actual torque of the TRC target wheel 5t is able to be reduced by reducing the output of a drive device or applying a braking force. Thus, a spin of the TRC target wheel 5t is suppressed. In this way, the estimated vehicle body speed Ve is used to calculate the slip ratio of each wheel 5. To highly accurately perform TRC, it is required to acquire a high-accuracy estimated vehicle body speed Ve.

1-2. Torque Limitation Process

In the first embodiment, the estimated vehicle body speed Ve estimated based on the wheel speeds of the wheels 5 will be considered. For the sake of convenience, the estimated vehicle body speed Ve that is estimated based on the wheel speeds is, hereinafter, referred to as "first estimated vehicle body speed Ve1". The first estimated vehicle body speed Ve1 based on the wheel speeds is known, and an estimation method therefor is not limited in the present embodiment. For example, the lowest one of the wheel speeds of the wheels 5 is acquired as the first estimated vehicle body speed Ve1. As another example, the second lowest one of the wheel speeds of the wheels 5 may be acquired as the first estimated vehicle body speed Ve1.

In a situation in which no wheel slip is occurring, the accuracy of the first estimated vehicle body speed Ve1 is high. However, when, for example, all the wheels 5 are in a slip, the first estimated vehicle body speed Ve1 that is estimated based on the wheel speeds is higher than an actual vehicle body speed Vt. In other words, an apparent increase of the first estimated vehicle body speed Ve1 occurs. Such a deviation of the first estimated vehicle body speed Ve1 from the actual vehicle body speed Vt undesirably leads to a decrease in the accuracy of vehicle control or information processing using the first estimated vehicle body speed Ve1.

The vehicle body speed estimation apparatus 10 according to the present embodiment has a function of reducing a deviation of the first estimated vehicle body speed Ve1 from the actual vehicle body speed Vt. More specifically, the vehicle body speed estimation apparatus 10 determines whether an apparent increase of the first estimated vehicle body speed Ve1 is occurring. When the vehicle body speed estimation apparatus 10 determines that an apparent increase of the first estimated vehicle body speed Ve1 is occurring, the vehicle body speed estimation apparatus 10 performs torque limitation to reduce the torque of a portion of the wheels 5. As a result of performing torque limitation, the wheel speed of a portion of the wheels 5 decreases, and the apparent increase of the first estimated vehicle body speed Ve1 is eliminated.

Figure 2:
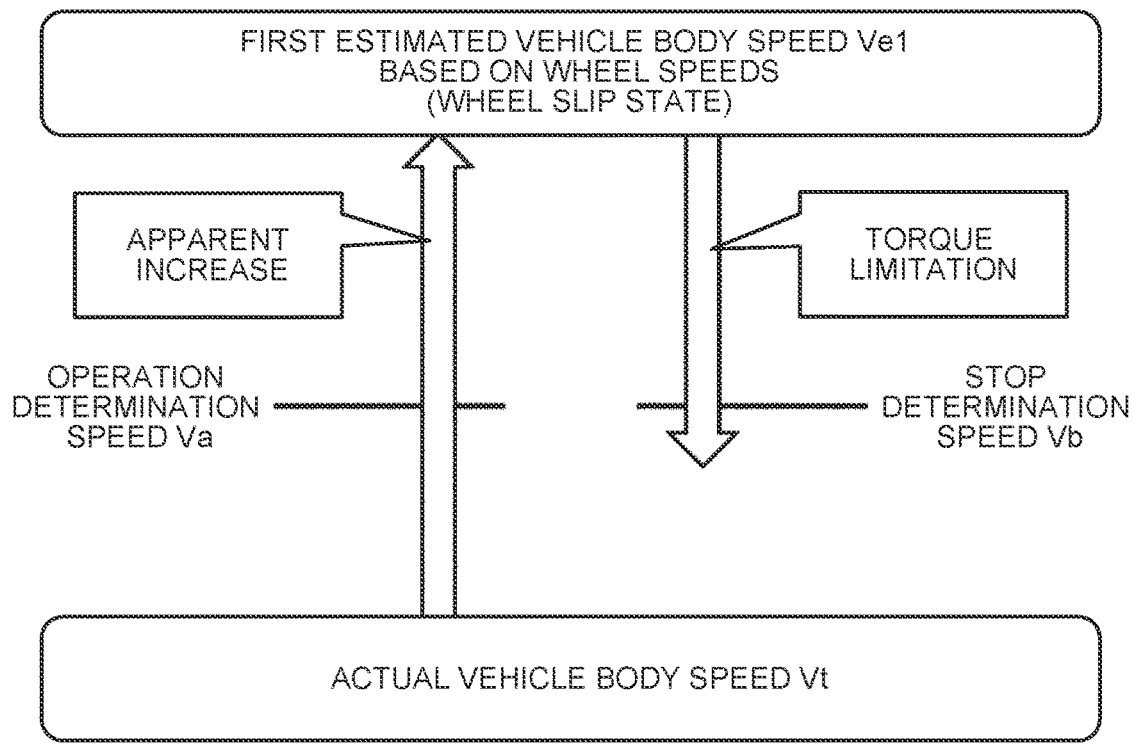
FIG. 2 is a conceptual view for illustrating torque limitation according to the first embodiment.

FIG. 2 is a conceptual view for illustrating the details of torque limitation according to the first embodiment.

Initially, the vehicle body speed estimation apparatus 10 determines whether the operation condition of torque limitation is satisfied. The operation condition of torque limitation is that there is an apparent increase of the first estimated vehicle body speed Ve1. To detect such an apparent increase of the first estimated vehicle body speed Ve1, an operation determination speed Va is used.

The operation determination speed Va is set so as to be higher than the first estimated vehicle body speed Ve1 in a state where no wheel slip is occurring and lower than the first estimated vehicle body speed Ve1 in a state where a wheel slip is occurring. At least the operation determination speed Va is not dependent on the wheel speeds. For example, the vehicle body speed estimation apparatus 10 calculates the operation determination speed Va based on an integral of the longitudinal acceleration of the vehicle 1. The operation determination speed Va based on the integral of the longitudinal acceleration of the vehicle 1 is expressed by, for example, the following mathematical expression (1).

Mathematical Expression (1): $Va = (Gx \times \alpha) \times (\text{Actual period of time})$ In the mathematical expression (1), Gx is a longitudinal acceleration (after filtering) detected by an acceleration sensor mounted on the vehicle 1. $\alpha$ is a gain greater than one. The gain $\alpha$ is set in advance in consideration of an error of the acceleration sensor. The operation determination speed Va expressed by the mathematical expression (1) may be regarded as an estimated vehicle body speed that is estimated based on the integral of the longitudinal acceleration Gx.

As another example, the operation determination speed Va may be expressed by the following mathematical expression (2).

Mathematical Expression (2): $Va = (Gx \times \alpha) \times (\text{Actual period of time}) + \beta$ In the mathematical expression (2), $\beta$ is a set value (positive value). For example, the set value $\beta$ is a value corresponding to a wheel slip amount by which an adequate grip is generated in the wheels 5. The operation determination speed Va expressed by the mathematical expression (2) may be regarded as the sum of "the estimated vehicle body speed that is estimated based on the integral of the longitudinal acceleration Gx" and "the set value $\beta$ corresponding to a set slip amount".

The operation determination speed Va described above is lower, that is, closer to the actual vehicle body speed Vt, than the first estimated vehicle body speed Ve1 in a state where a wheel slip is occurring. The fact that the first estimated vehicle body speed Ve1 exceeds the operation determination speed Va means that an apparent increase of the first estimated vehicle body speed Ve1 is occurring.

From the above viewpoint, the operation condition of torque limitation is set so as to include at least a condition that the first estimated vehicle body speed Ve1 is higher than the operation determination speed Va. The operation condition of torque limitation may include a condition that the duration of a state where the first estimated vehicle body speed Ve1 is higher than or equal to the operation determination speed Va is longer than or equal to a set period of time.

When the operation condition is satisfied, the vehicle body speed estimation apparatus 10 performs torque limitation. In torque limitation, the vehicle body speed estimation apparatus 10 reduces the torque of a portion of the wheels 5 as compared to the torque before performing torque limitation. For example, the vehicle body speed estimation apparatus 10 performs torque limitation by multiplying the torque of a portion of the wheels 5 by a gain less than one. For example, the vehicle body speed estimation apparatus 10 reduces the torque of the rear wheels 5R without reducing the torque of the front wheels 5F. Reducing the torque of the rear wheels 5R not the front wheels 5F is desirable from the viewpoint of vehicle stability. As another example, the vehicle body speed estimation apparatus 10 may reduce the torque of the front wheels 5F without reducing the torque of the rear wheels 5R.

As a result of performing such torque limitation, the wheel speed of a portion of the wheels 5 decreases and a slip of the portion of the wheels 5 is reduced. As a result, the first estimated vehicle body speed Ve1 also decreases and approaches the actual vehicle body speed Vt.

However, unnecessary continuation of torque limitation affects acceleration of the vehicle 1 and leads to a stall of the vehicle 1 in some cases. Therefore, after the start of torque limitation, the vehicle body speed estimation apparatus 10 determines whether a stop condition of torque limitation is satisfied. The stop condition of torque limitation is that the apparent increase of the first estimated vehicle body speed Ve1 is eliminated.

For example, the stop condition of torque limitation includes a condition that the first estimated vehicle body speed Ve1 is lower than or equal to a stop determination speed Vb. The stop determination speed Vb is set based on a similar viewpoint to the operation determination speed Va. For example, the stop determination speed Vb is expressed by the following mathematical expression (3) or mathematical expression (4).

Mathematical Expression (3): Vb=(Gx×α)×(Actual period of time)

Mathematical Expression (4): Vb=(Gx×α)×(Actual period of time)+β

The vehicle body speed estimation apparatus 10 calculates the stop determination speed Vb based on an integral of the longitudinal acceleration Gx of the vehicle 1. The stop determination speed Vb expressed by the mathematical expression (3) may be regarded as an estimated vehicle body speed that is estimated based on the integral of the longitudinal acceleration Gx. The stop determination speed Vb expressed by the mathematical expression (4) may be regarded as the sum of "the estimated vehicle body speed that is estimated based on the integral of the longitudinal acceleration Gx" and "the set value β corresponding to a set slip amount".

The operation determination speed Va and the stop determination speed Vb may be the same or may be different. The gain α in the mathematical expression (1) or the mathematical expression (2) and the gain α in the mathematical expression (3) or the mathematical expression (4) may be the same or may be different. The set value β in the mathematical expression (2) and the set value β in the mathematical expression (4) may be the same or may be different. It is possible to adjust the operation determination speed Va and the stop determination speed Vb as needed by adjusting the gain α or the set value β. In any case, the operation determination speed Va and the stop determination speed Vb are lower, that is, closer to the actual vehicle body speed Vt, than the first estimated vehicle body speed Ve1 in a state where a wheel slip is occurring.

When the first estimated vehicle body speed Ve1 is lower than or equal to the stop determination speed Vb, that is, when the stop condition is satisfied, the vehicle body speed estimation apparatus 10 stops (cancels) torque limitation. For example, the vehicle body speed estimation apparatus 10 stops multiplying the torque of a portion of the wheels 5 subjected to torque limitation by the gain less than one. As a result, the first estimated vehicle body speed Ve1 returns to the stop determination speed Vb close to the actual vehicle body speed Vt. In other words, the accuracy of the first estimated vehicle body speed Ve1 improves (recovers). In other words, the accuracy of the first estimated vehicle body speed Ve1 is ensured. Torque limitation is not continued more than necessary, so a stall of the vehicle 1 is also prevented.

Particularly, the stop determination speed Vb expressed by the mathematical expression (4) includes the set value β corresponding to a wheel slip amount by which an adequate grip is generated in the wheels 5. It is possible to prevent an excessive return of the first estimated vehicle body speed Ve1 by using the stop determination speed Vb expressed by the mathematical expression (4). In other words, it is possible to reliably prevent a stall of the vehicle 1 while appropriately recovering the accuracy of the first estimated vehicle body speed Ve1.

The stop determination speed Vb can be lower than the actual vehicle body speed Vt due to factors, such as an acceleration sensor error and a road grade change. In this case, there is a possibility that the stop condition that the first estimated vehicle body speed Ve1 is lower than or equal to the stop determination speed Vb is not satisfied and torque limitation is continued. Therefore, as a modification to the stop condition of torque limitation, a condition that the duration of a state where the wheel acceleration of a portion of the wheels 5, to which torque limitation is applied, is higher than zero is longer than or equal to a set period of time may be added. The fact that the duration of the state where the wheel acceleration is higher than zero is longer than or equal to a set period of time means that a wheel slip has stopped.

In this way, the stop condition of torque limitation according to the present embodiment includes the condition that the first estimated vehicle body speed Ve1 is lower than or equal to the stop determination speed Vb or the condition that the duration of the state where the wheel acceleration of a portion of the wheels 5, to which torque limitation is applied, is higher than zero is longer than or equal to a set period of time. Since such a stop condition is provided, unnecessary continuation of torque limitation is prevented. As a result, a stall of the vehicle 1 is prevented.

Figure 3:
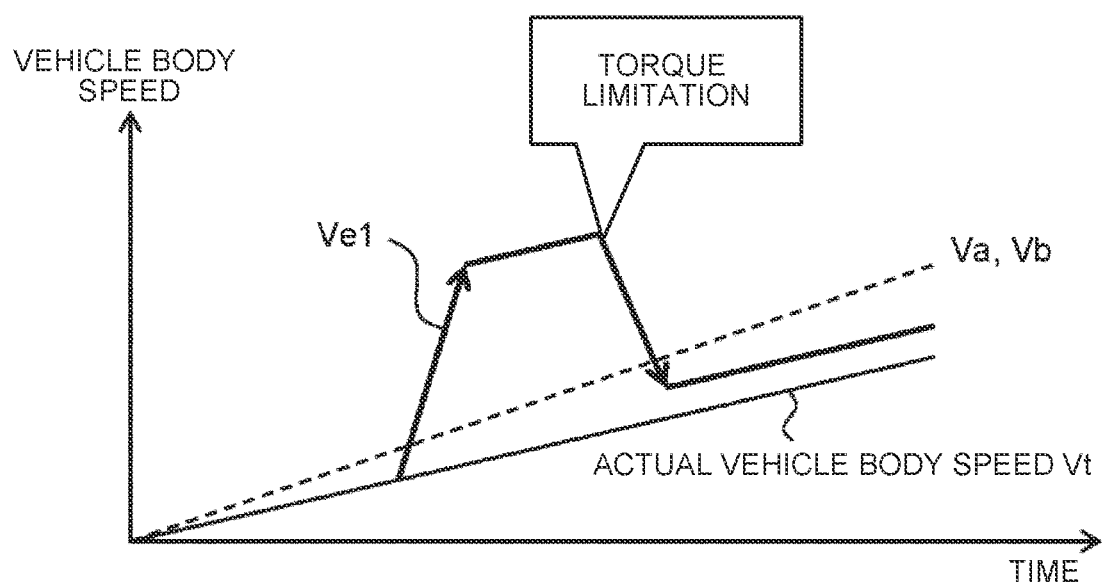
FIG. 3 is a timing chart showing an example of the torque limitation according to the first embodiment.

FIG. 3 is a timing chart showing an example of torque limitation. The abscissa axis represents time, and the ordinate axis represents various vehicle body speeds (first estimated vehicle body speed Ve1, operation determination speed Va, stop determination speed Vb, and actual vehicle body speed Vt). While the vehicle 1 is accelerating, a wheel slip occurs, and an apparent increase of the first estimated vehicle body speed Ve1 occurs. When the duration of a state where the first estimated vehicle body speed Ve1 is higher than the operation determination speed Va is longer than or equal to a set period of time, torque limitation is activated. As a result of torque limitation, the first estimated vehicle body speed Ve1 decreases. When the first estimated vehicle body speed Ve1 is lower than or equal to the stop determination speed Vb, torque limitation stops. Thus, the first estimated vehicle body speed Ve1 returns to a value close to the actual vehicle body speed Vt.

1-3. Effects

As described above, according to the present embodiment, the first estimated vehicle body speed Ve1 is acquired based on wheel speeds. When the operation condition that includes at least the condition that the first estimated vehicle body speed Ve1 is higher than the operation determination speed Va is satisfied, torque limitation to reduce the torque of a portion of the wheels 5 is performed. After that, when the stop condition is satisfied, the torque limitation stops. As a result of such torque limitation, an apparent increase of the first estimated vehicle body speed Ve1 is eliminated, and the accuracy of the first estimated vehicle body speed Ve1 improves (recovers). In other words, the accuracy of the first estimated vehicle body speed Ve1 is ensured.

According to the present embodiment, the stop condition of torque limitation is provided. Therefore, continuation of torque limitation more than necessary is prevented. As a result, a stall of the vehicle 1 is prevented. Particularly, it is possible to prevent an excessive return of the first estimated vehicle body speed Ve1 by using the stop determination speed Vb expressed by the mathematical expression (4). In other words, it is possible to reliably prevent a stall of the vehicle 1 while appropriately recovering the accuracy of the first estimated vehicle body speed Ve1.

A portion of the wheels 5, to which torque limitation is applied, may be not the front wheels 5F and may be the rear wheels 5R. Reducing the torque of the rear wheels 5R not the front wheels 5F is desirable from the viewpoint of vehicle stability.

Since the accuracy of the first estimated vehicle body speed Ve1 is ensured, the accuracy of vehicle control or information processing using the first estimated vehicle body speed Ve1 is also ensured.

For example, the first estimated vehicle body speed Ve1 is used in TRC. Specifically, the slip ratio of each wheel 5 is calculated based on the wheel speed of the wheel 5 and the first estimated vehicle body speed Ve1. Since the accuracy of the first estimated vehicle body speed Ve1 is ensured, the accuracy of TRC is also ensured. This is useful from the viewpoint of acceleration performance and vehicle stability.

1-4. Example of Configuration of Vehicle Control System

Figure 4:
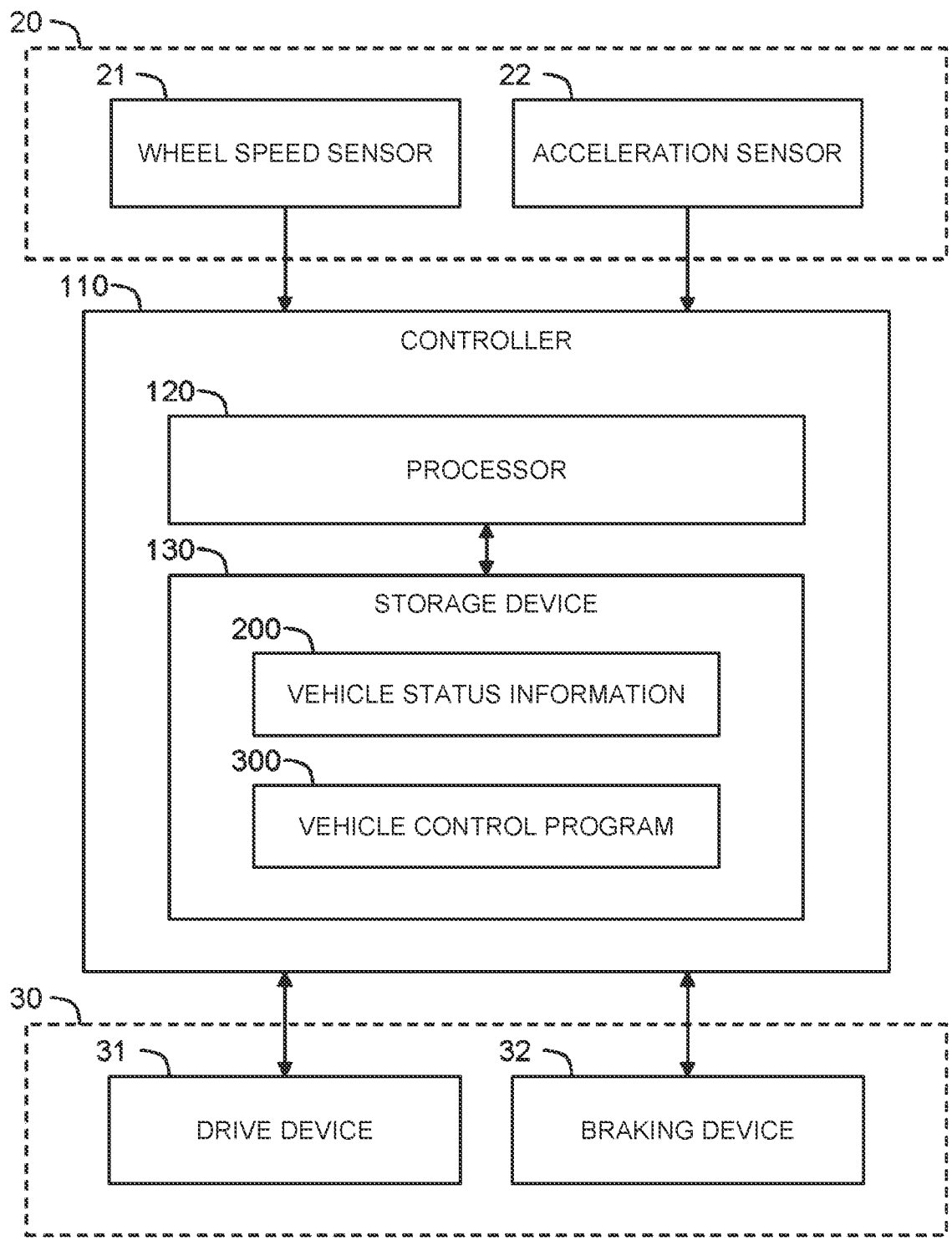
FIG. 4 is a block diagram showing an example of the configuration of a vehicle control system according to the first embodiment.

FIG. 4 is a block diagram showing an example of the configuration of a vehicle control system 100 according to the first embodiment. The vehicle control system 100 controls the vehicle 1. Typically, the vehicle control system 100 is mounted on the vehicle 1. Alternatively, at least part of the vehicle control system 100 may be included in a remote system outside the vehicle 1, and the vehicle 1 may be remotely controlled. In other words, the vehicle control system 100 may be disposed in a distributed manner in the vehicle 1 and the remote system.

The vehicle control system 100 includes a sensor group 20, a traveling apparatus 30, and a controller 110.

The sensor group 20 is mounted on the vehicle 1 and detects the vehicle status of the vehicle 1. The sensor group 20 includes a wheel speed sensor 21, an acceleration sensor 22, and other sensors. The wheel speed sensor 21 detects the wheel speed of each wheel 5. The acceleration sensor 22 detects various accelerations including the longitudinal acceleration Gx of the vehicle 1.

The traveling apparatus 30 is mounted on the vehicle 1. The traveling apparatus 30 includes a drive device 31 and a braking device 32. The drive device 31 drives the wheels 5. The drive device 31 is capable of driving the front wheels 5F and the rear wheels 5R independently of each other. For example, the drive device 31 includes a front wheel motor that drives the front wheels 5F and a rear wheel motor that drives the rear wheels 5R. The drive device 31 may include in-wheel motors respectively provided in the wheels 5. The braking device 32 applies a braking force to each of the wheels 5 independently of one another.

The controller 110 is a computer that controls the vehicle 1. The controller 110 includes one or plurality of processors 120 (hereinafter, simply referred to as processor 120) and one or plurality of storage devices 130 (hereinafter, simply referred to as storage device 130). The processor 120 executes various processing. For example, the processor 120 includes a central processing unit (CPU). The storage device 130 stores various pieces of information. Examples of the storage device 130 include a volatile memory, a nonvolatile memory, a hard disk drive (HDD), and a solid state drive (SSD). The controller 110 may include one or plurality of electronic control units (ECUs). Part of the controller 110 may be an information processing apparatus outside the vehicle 1. In this case, part of the controller 110 communicates with the vehicle 1 and remotely controls the vehicle 1.

Vehicle status information 200 indicates a vehicle status detected by the sensor group 20. Specifically, the vehicle status information 200 includes the wheel speeds of the wheels 5, detected by the wheel speed sensor 21, the longitudinal acceleration Gx detected by the acceleration sensor 22, and the like. The controller 110 (processor 120) acquires the vehicle status information 200 from the sensor group 20. The vehicle status information 200 is stored in the storage device 130.

A vehicle control program 300 is a computer program that is run by the processor 120. The controller 110 (processor 120) implements various processing by running the vehicle control program 300. The vehicle control program 300 is stored in the storage device 130. The vehicle control program 300 may be recorded in a computer-readable recording medium.

The controller 110 (processor 120) executes torque control (driving force control) over the wheels 5. More specifically, the controller 110 calculates a target torque of each wheel 5. The controller 110 controls the operations of the drive device 31 and braking device 32 such that the target torque of each wheel 5 is obtained.

The controller 110 (processor 120) performs traction control (TRC) as needed. More specifically, the controller 110 acquires an estimated vehicle body speed Ve based on the vehicle status information 200. The controller 110 calculates the slip ratio of each wheel 5 based on the wheel speeds of the wheels 5 and the estimated vehicle body speed Ve. When the slip ratio of any one or some of the wheels 5 exceeds a threshold, the controller 110 activates TRC. The TRC target wheel 5t is the wheel 5 of which the slip ratio exceeds the threshold. For example, the controller 110 executes torque control such that the slip ratio of the TRC target wheel 5t decreases to a target slip ratio (for example, 10% to 15%).

The controller 110 also has a function of the vehicle body speed estimation apparatus 10 according to the present embodiment. The controller 110 acquires an estimated vehicle body speed Ve based on the vehicle status information 200. In addition, the controller 110 performs the above-described torque limitation as needed. Hereinafter, an example of a process related to torque limitation, executed by the controller 110, according to the present embodiment will be described.

1-5. Example of Process Flow of Torque Limitation

Figure 5:
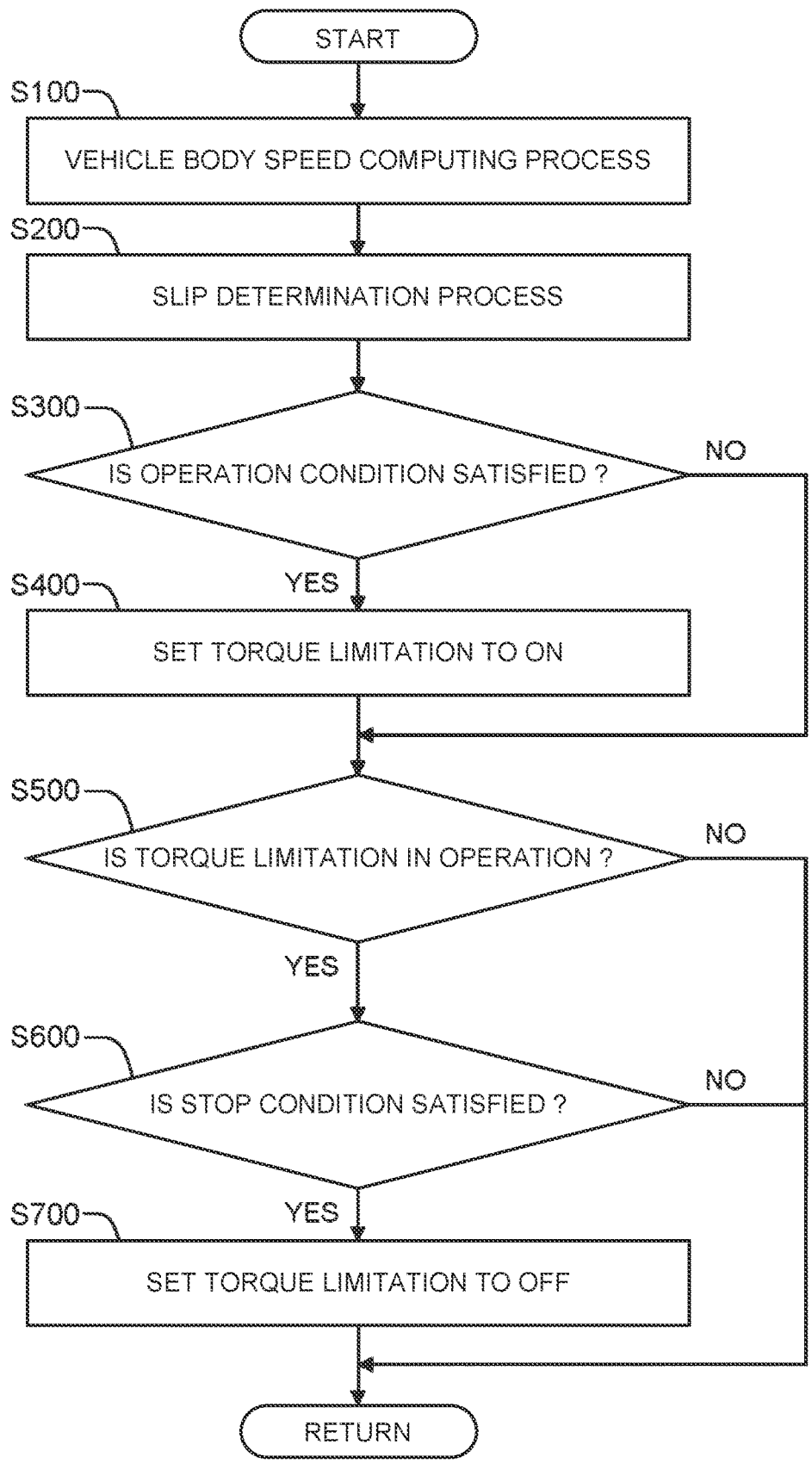
FIG. 5 is a flowchart showing an example of a process related to torque limitation according to the first embodiment.

FIG. 5 is a flowchart showing an example of a process related to torque limitation, executed by the controller 110, according to the first embodiment. The process flow shown in FIG. 5 is repeatedly executed at every predetermined cycle.

1-5-1. Step S100

In step S100, the controller 110 executes a vehicle body speed computing process to calculate various vehicle body speeds based on the vehicle status information 200. Specifically, the controller 110 estimates a first estimated vehicle body speed Ve1 based on wheel speeds. The controller 110 calculates an operation determination speed Va and a stop determination speed Vb based on the integral of the longitudinal acceleration Gx (see the mathematical expressions (1) to (4)). The controller 110 calculates a second estimated vehicle body speed Ve2 expressed by the following mathematical expression (5).

Mathematical Expression (5): Ve2=(Gx×α+OFST)× (Actual period of time)

In the mathematical expression (5), Gx is a longitudinal acceleration (after filtering) detected by the acceleration sensor 22. α is a gain greater than one (for example, α=1.15). The gain a is set in consideration of an error of the acceleration sensor 22. The offset OFST is added such that the second estimated vehicle body speed Ve2 is not undervalued at the time when the vehicle 1 runs from a flat road to a downhill road. The second estimated vehicle body speed Ve2 expressed by the mathematical expression (5) may be regarded as an estimated vehicle body speed that is estimated based on the integral of the sum of the longitudinal acceleration Gx and the offset OFST.

1-5-2. Step S200

In step S200, the controller 110 executes a slip determination process to determine whether a wheel slip is occurring. For example, the slip determination condition includes at least the condition that the first estimated vehicle body speed Ve1 based on wheel speeds is higher than the second estimated vehicle body speed Ve2 based on the longitudinal acceleration. The slip determination condition may include the condition that the duration of a state where the first estimated vehicle body speed Ve1 is higher than the second estimated vehicle body speed Ve2 is longer than or equal to a set period of time.

When the slip determination condition is not satisfied, the controller 110 determines that no wheel slip is occurring. On the other hand, when the slip determination condition is satisfied, the controller 110 determines that a wheel slip is occurring. The result of the slip determination process is used later.

1-5-3. Step S300

In step S300, the controller 110 executes an operation condition determination process to determine whether the operation condition of torque limitation is satisfied. When the operation condition of torque limitation is satisfied (Yes in step S300), the process proceeds to step S400. On the other hand, when the operation condition of torque limitation is not satisfied (No in step S300), the process skips step S400 and proceeds to step S500.

The operation condition of torque limitation is defined based on the relationship between the estimated vehicle body speed Ve and the operation determination speed Va. Hereinafter, various examples of the operation condition of torque limitation will be described. In the first embodiment, the estimated vehicle body speed Ve is the first estimated vehicle body speed Ve1 that is estimated based on wheel speeds (Ve=Ve1).

First Example of Operation Condition

Figure 6:
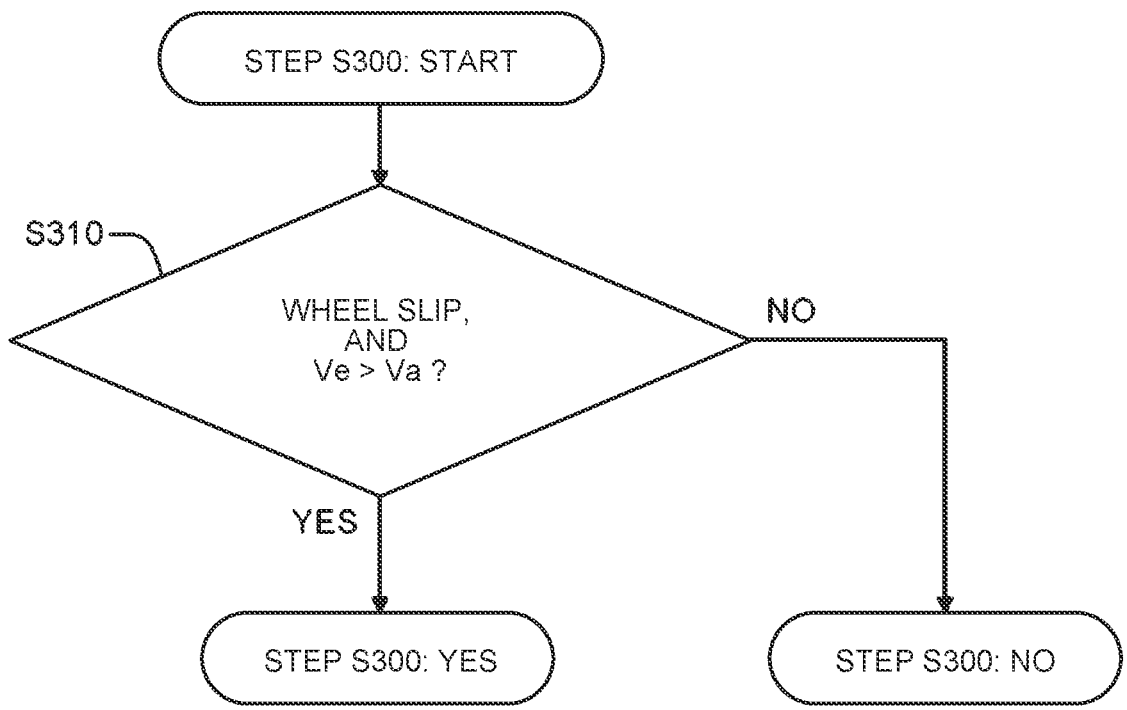
FIG. 6 is a flowchart for illustrating a first example of an operation condition of torque limitation.

FIG. 6 is a flowchart for illustrating a first example of the operation condition of torque limitation. The first example of the operation condition of torque limitation is a condition that a wheel slip is occurring and the estimated vehicle body speed Ve is higher than the operation determination speed Va. In step S310, the controller 110 determines whether a wheel slip is occurring and the estimated vehicle body speed Ve is higher than the operation determination speed Va. When the result of step S310 is negative (No in step S310), the operation condition is not satisfied (No in step S300). On the other hand, when the result of step S310 is affirmative (Yes in step S310), the operation condition is satisfied (Yes in step S300).

Second Example of Operation Condition

Figure 7:
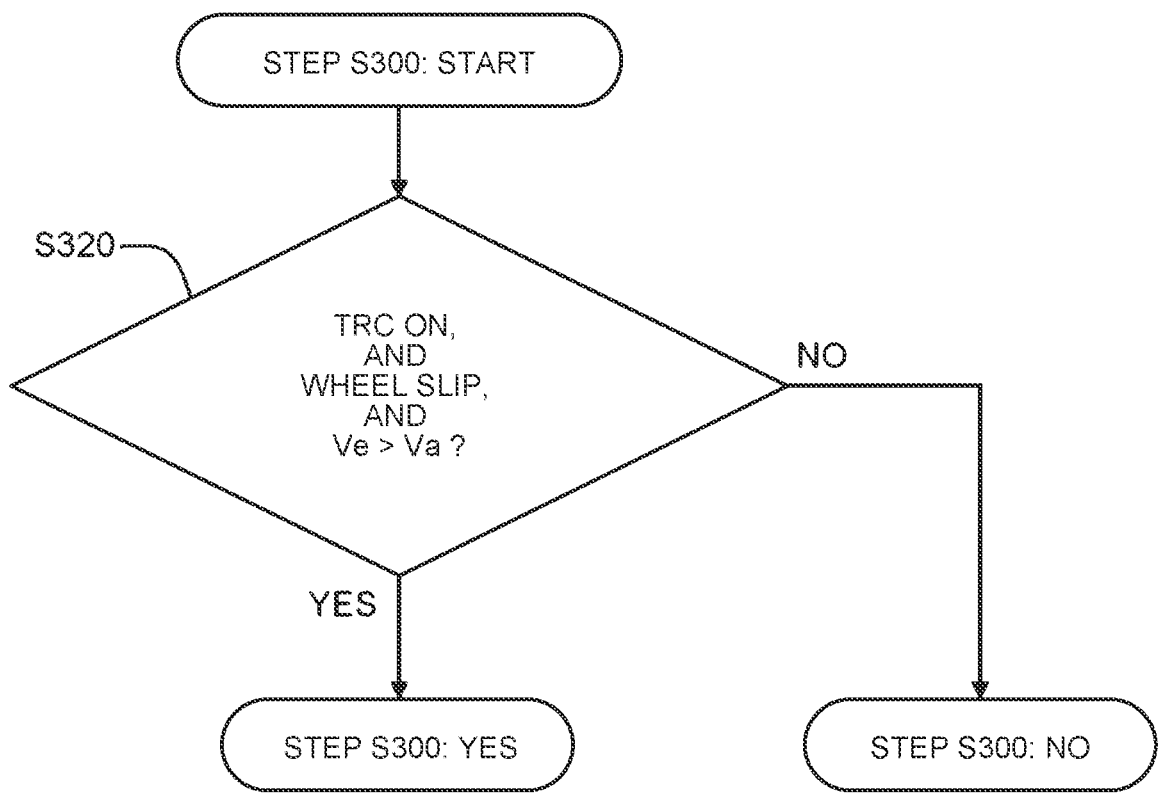
FIG. 7 is a flowchart for illustrating a second example of the operation condition of torque limitation.

FIG. 7 is a flowchart for illustrating a second example of the operation condition of torque limitation. The second example of the operation condition of torque limitation is a condition that TRC is in operation, a wheel slip is occurring, and the estimated vehicle body speed Ve is higher than the operation determination speed Va. In step S320, the controller 110 determines whether TRC is in operation, a wheel slip is occurring, and the estimated vehicle body speed Ve is higher than the operation determination speed Va. When the result of step S320 is negative (No in step S320), the operation condition is not satisfied (No in step S300). On the other hand, when the result of step S320 is affirmative (Yes in step S320), the operation condition is satisfied (Yes in step S300).

Third Example of Operation Condition

Figure 8:
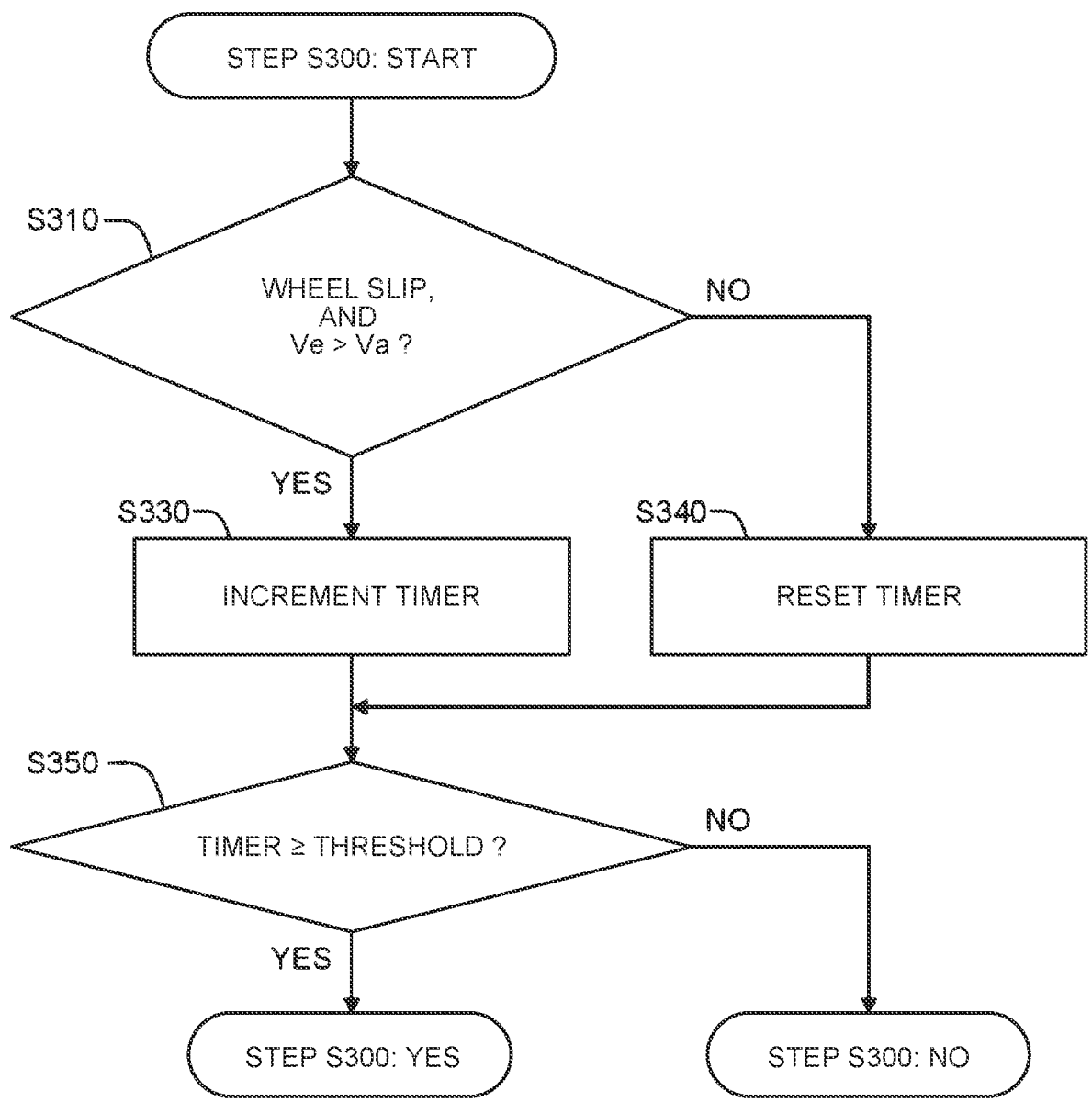
FIG. 8 is a flowchart for illustrating a third example of the operation condition of torque limitation.

FIG. 8 is a flowchart for illustrating a third example of the operation condition of torque limitation. The third example is a modification of the first example. The third example of the operation condition of torque limitation is a condition that a wheel slip is occurring and the duration of a state where the estimated vehicle body speed Ve is higher than the operation determination speed Va is longer than or equal to a set period of time. When the result of step S310 is affirmative (Yes in step S310), the controller 110 increments a timer (step S330). On the other hand, when the result of step S310 is negative (No in step S310), the controller 110 resets the timer (step S340). When the timer is less than a threshold (No in step S350), the operation condition is not satisfied (No step S300). On the other hand, when the timer is greater than or equal to the threshold (Yes in step S350), the operation condition is satisfied (Yes in step S300).

Fourth Example of Operation Condition

FIG. 9 is a flowchart for illustrating a fourth example of the operation condition of torque limitation. The fourth example is a modification of the second example. The fourth example of the operation condition of torque limitation is a condition that TRC is in operation, a wheel slip is occurring, and the duration of a state where the estimated vehicle body speed Ve is higher than the operation determination speed Va is longer than or equal to a set period of time. When the result of step S320 is affirmative (Yes in step S320), the controller 110 increments the timer (step S330). On the other hand, when the result of step S320 is negative (No in step S320), the controller 110 resets the timer (step S340). When the timer is less than a threshold (No in step S350), the operation condition is not satisfied (No step S300). On the other hand, when the timer is greater than or equal to the threshold (Yes in step S350), the operation condition is satisfied (Yes in step S300).

1-5-4. Step S400

In step S400, the controller 110 performs torque limitation. Specifically, the controller 110 reduces the torque of a portion of the wheels 5 as compared to that before performing torque limitation. For example, the controller 110 reduces the torque of the rear wheels 5R without reducing the torque of the front wheels 5F. Reducing the torque of the rear wheels 5R not the front wheels 5F is desirable from the viewpoint of vehicle stability. As another example, the controller 110 may reduce the torque of the front wheels 5F without reducing the torque of the rear wheels 5R.

FIG. 10 is a conceptual view for illustrating examples of limit torques at the time when torque limitation is performed. A front torque Tf and a rear torque Tr are respectively a target torque of the front wheels 5F and a target torque of the rear wheels 5R when TRC is not in operation. The front torque Tf and the rear torque Tr are calculated from an accelerator depression amount or the like. A front TRC torque Tf_trc and a rear TRC torque Tr_trc are respectively a target torque of the front wheels 5 and a target torque of the rear wheels 5R when TRC is in operation. The front TRC torque Tf_trc and the rear TRC torque Tr_trc are required from TRC. The front TRC torque Tf_trc and the rear TRC torque Tr_trc are respectively less than the front torque Tf and the rear torque Tr.

Initially, the case where target wheels to which torque limitation is applied are the rear wheels 5R will be described. A limit rear torque TRr is a target torque of torque limitation for the rear wheels 5R. When TRC is not in operation (see FIG. 6 and FIG. 8), the limit rear torque TRr is a product of the front torque Tf and a gain γ or a product of the rear torque Tr and the gain γ. Here, the gain γ is a constant greater than zero and less than one (0<γ<1). On the other hand, when TRC is in operation (see FIG. 7 and FIG. 9), coordination is performed. For example, a smaller one of the product of the front TRC torque Tf_trc and the gain γ and the rear TRC torque Tr_trc is output. Alternatively, the limit rear torque TRr may be the product of the rear TRC torque Tr_trc and the gain γ.

Next, the case where target wheels to which torque limitation is applied are the front wheels 5F will be described. A limit front torque TRf is a target torque of torque limitation for the front wheels 5F. When TRC is not in operation (see FIG. 6 and FIG. 8), the limit front torque TRf is a product of the rear torque Tr and the gain γ or a product of the front torque Tf and the gain γ. On the other hand, when TRC is in operation (see FIG. 7 and FIG. 9), coordination is performed. For example, a smaller one of the product of the rear TRC torque Tr_trc and the gain γ and the front TRC torque Tf_trc is output. Alternatively, the limit front torque TRf may be the product of the front TRC torque Tf_trc and the gain γ.

1-5-5. Step S500

In step S500, the controller 110 determines whether torque limitation is in operation. When torque limitation is in operation (Yes in step S500), the process proceeds to step S600. When torque limitation is not in operation (No in step S500), the process in this cycle ends.

1-5-6. Step S600

In step S600, the controller 110 executes the stop condition determination process to determine whether the stop condition of torque limitation is satisfied. When the stop condition of torque limitation is satisfied (Yes in step S600), the process proceeds to step S700. On the other hand, when the stop condition of torque limitation is not satisfied (No in step S600), the process in this cycle ends.

Figure 11:
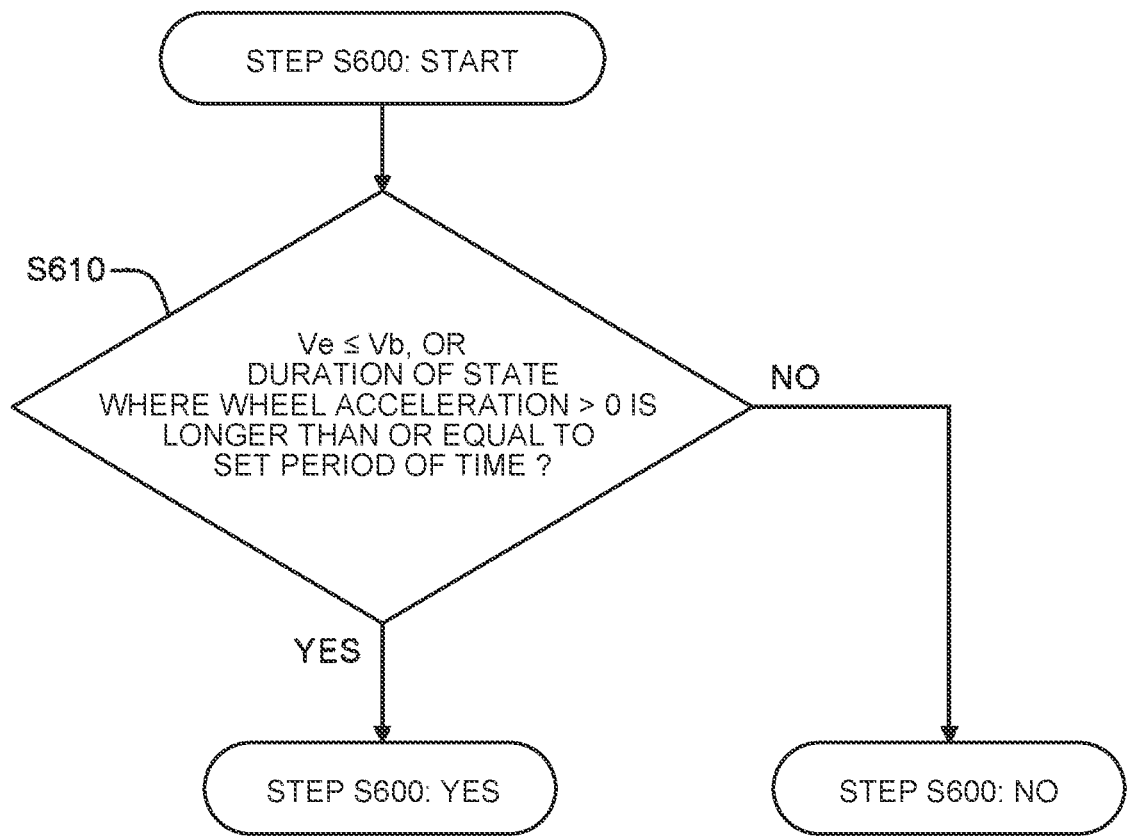
FIG. 11 is a flowchart for illustrating an example of a stop condition of torque limitation.

FIG. 11 is a flowchart for illustrating an example of the stop condition of torque limitation. For example, the stop condition of torque limitation includes a condition that the estimated vehicle body speed Ve is lower than or equal to the stop determination speed Vb or a condition that the duration of a state where the wheel acceleration of a portion of the wheels 5, to which torque limitation is applied, is higher than zero is longer than or equal to a set period of time (see Section 1-2). In step S610, the controller 110 determines whether the stop condition is satisfied.

1-5-7. Step S700

In step S700, the controller 110 stops torque limitation. Thus, the accuracy of the estimated vehicle body speed Ve is ensured.

2. Second Embodiment

Figure 12:
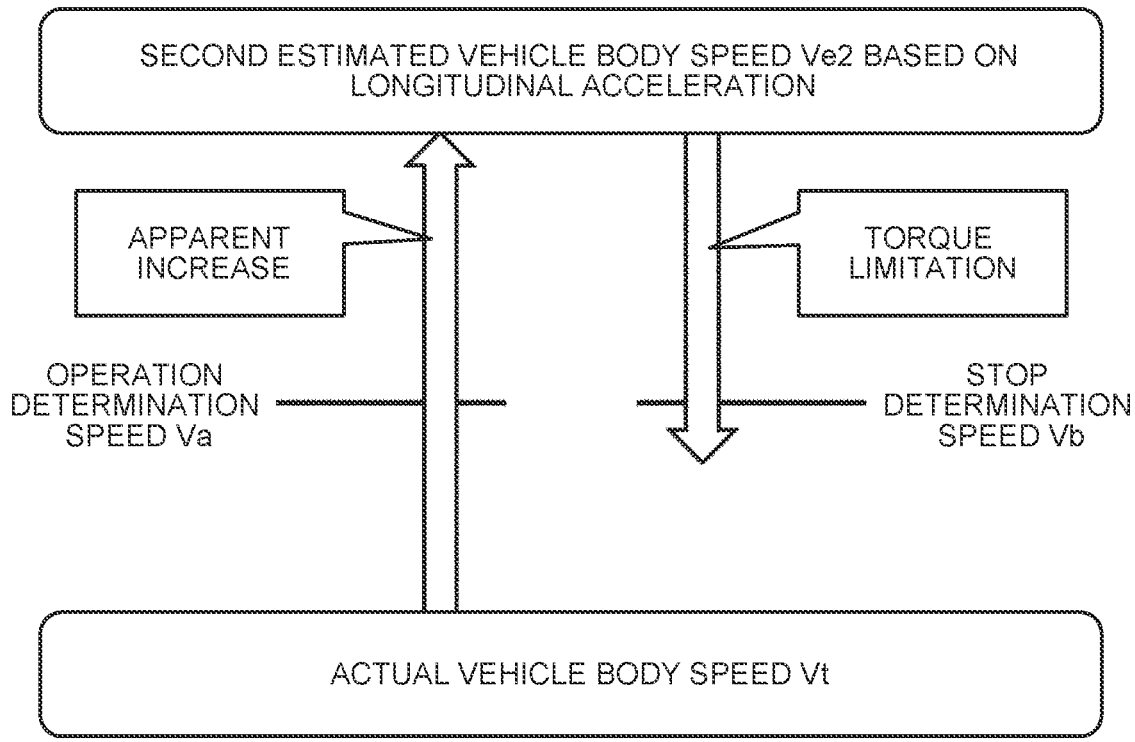
FIG. 12 is a conceptual view for illustrating torque limitation according to a second embodiment.

FIG. 12 is a conceptual view for illustrating torque limitation according to a second embodiment. In the second embodiment, the second estimated vehicle body speed Ve2 expressed by the mathematical expression (5) is used as the estimated vehicle body speed Ve. The second estimated vehicle body speed Ve2 is an estimated vehicle body speed that is estimated based on the integral of the sum of the longitudinal acceleration Gx and the offset OFST. The offset OFST is added such that the second estimated vehicle body speed Ve2 is not undervalued at the time when the vehicle 1 runs from a flat road to a downhill road. Since the offset OFST is added, the second estimated vehicle body speed Ve2 also tends to be estimated to be higher. In other words, there is a possibility that an apparent increase also occurs in the second estimated vehicle body speed Ve2. Thus, a torque limitation process is also effective to the second estimated vehicle body speed Ve2.

The operation determination speed Va and the stop determination speed Vb are similar to those in the case of the first embodiment. The configuration of the vehicle control system 100 is also similar to that in the case of the first embodiment. The description overlapping that of the first embodiment is omitted as needed.

Figure 13:
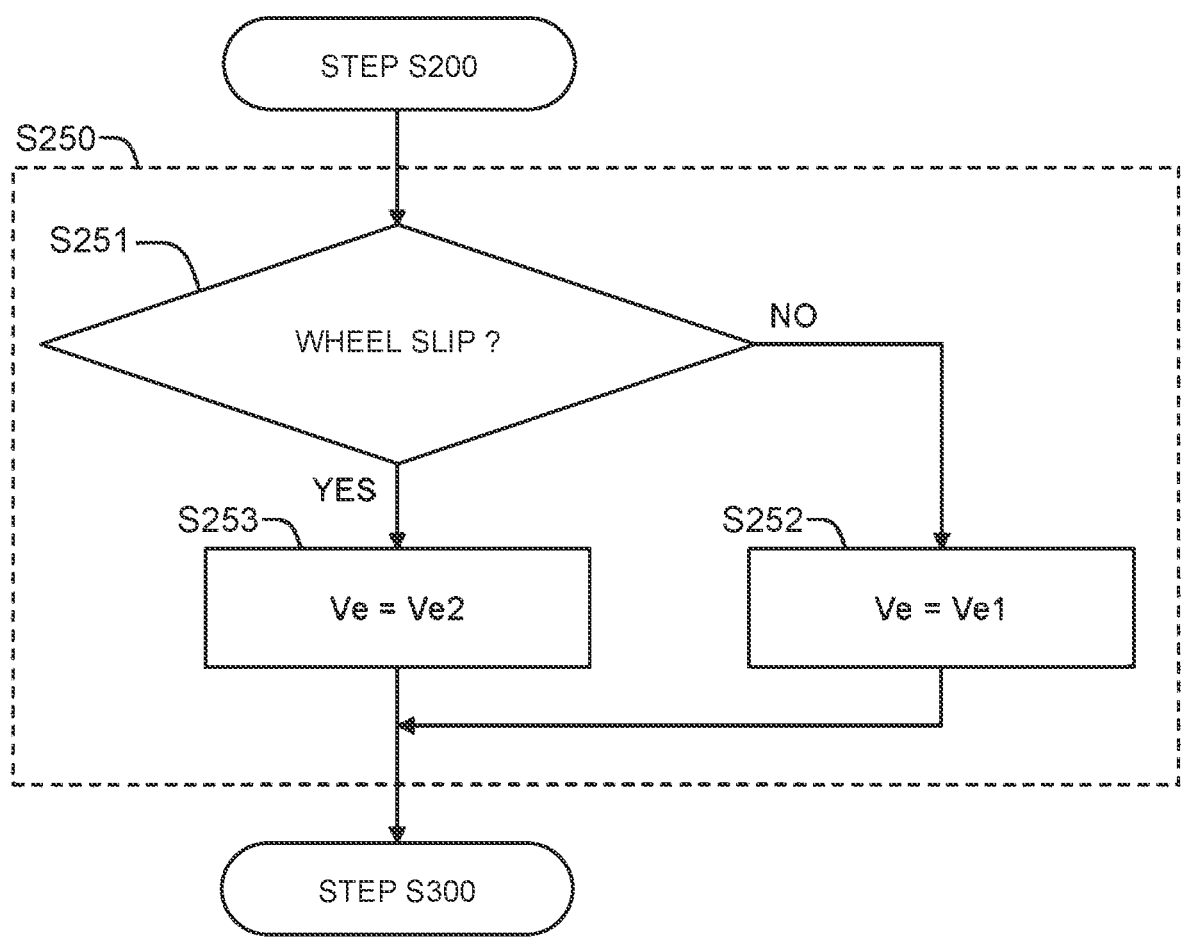
FIG. 13 is a flowchart showing a process related to torque limitation according to the second embodiment.

FIG. 13 is a flowchart showing a process related to torque limitation according to the second embodiment. Step S250 is added between step S200 and step S300 shown in FIG. 5.

As described above, in step S200, the controller 110 determines whether a wheel slip is occurring. For example, the slip determination condition includes the condition that the first estimated vehicle body speed Ve1 is higher than the second estimated vehicle body speed Ve2. The slip determination condition may include the condition that the duration of a state where the first estimated vehicle body speed Ve1 is higher than the second estimated vehicle body speed Ve2 is longer than or equal to a set period of time.

In step S250, the controller 110 switches the estimated vehicle body speed Ve in accordance with the result of step S200. More specifically, when a wheel slip is not occurring (No in step S251), the controller 110 sets the first estimated vehicle body speed Ve1 for the estimated vehicle body speed Ve. On the other hand, when a wheel slip is occurring (Yes in step S251), the controller 110 sets the second estimated vehicle body speed Ve2 for the estimated vehicle body speed Ve.

When no wheel slip is occurring, the accuracy of the first estimated vehicle body speed Ve1 is high. However, when a wheel slip is occurring, the accuracy of the first estimated vehicle body speed Ve1 that depends on wheel speeds decreases, and the accuracy of the second estimated vehicle body speed Ve2 that does not depend on wheel speeds is higher than that of the first estimated vehicle body speed Ve1. Therefore, the accuracy of the estimated vehicle body speed Ve improves by switching the estimated vehicle body speed Ve from the first estimated vehicle body speed Ve1 to the second estimated vehicle body speed Ve2.

However, as described above, the accuracy of the second estimated vehicle body speed Ve2 is also not always high. Since the offset OFST is added, there is a possibility that an apparent increase also occurs in the second estimated vehicle body speed Ve2. Therefore, torque limitation is also applied to the second estimated vehicle body speed Ve2. As a result of torque limitation, when the wheel speed of a portion of the wheels 5 decreases, a wheel slip is eliminated. When the wheel slip is eliminated (No in step S251), the estimated vehicle body speed Ve switches from the second estimated vehicle body speed Ve2 to the first estimated vehicle body speed Ve1 (step S252). In other words, the estimated vehicle body speed Ve is reset to the high-accuracy first estimated vehicle body speed Ve1. Thus, the accuracy of the estimated vehicle body speed Ve is ensured.

Figure 14:
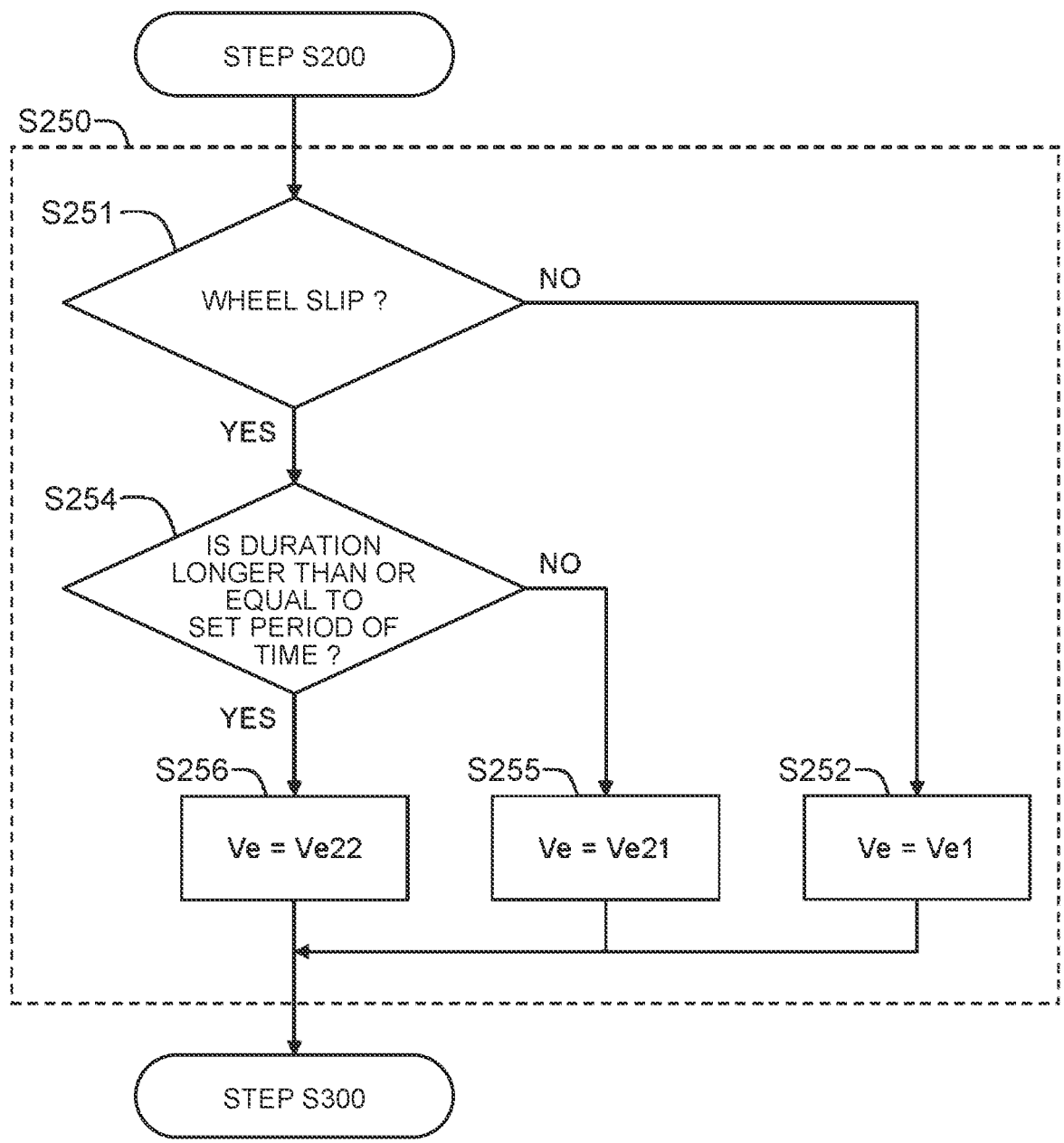
FIG. 14 is a flowchart showing a modification of the process related to torque limitation according to the second embodiment.

FIG. 14 shows a modification of the second embodiment. In the modification, two-type second estimated vehicle body speeds Ve21, Ve22 are used. The second estimated vehicle body speeds Ve21, Ve22 are respectively expressed by the following mathematical expressions (6) and (7).

Mathematical Expression (6): Ve21=(Gx×α1+ OFST1)×(Actual period of time)

Mathematical Expression (7): Ve22=(Gx×α2+ OFST2)×(Actual period of time)

The gain α2 in the mathematical expression (7) is less than the gain α1 in the mathematical expression (6). The offset OFST2 in the mathematical expression (7) is less than the offset OFST1 in the mathematical expression (6). In other words, the second estimated vehicle body speed Ve22 is further lower than the second estimated vehicle body speed Ve21.

In step S200, the second estimated vehicle body speed Ve21 is used. When the duration of a wheel slip is not longer than or equal to a set period of time (No in step S254), the controller 110 sets the second estimated vehicle body speed Ve21 for the estimated vehicle body speed Ve (step S255). On the other hand, when the duration of a wheel slip is longer than or equal to the set period of time (Yes in step S254), the controller 110 sets the second estimated vehicle body speed Ve22 for the estimated vehicle body speed Ve (step S256).

In this way, when a wheel slip occurs, it is possible to decrease the estimated vehicle body speed Ve in a stepwise manner. Thus, it is possible to further minutely improve the accuracy of the estimated vehicle body speed Ve.

What is claimed is:

1. A vehicle body speed estimation method applied to a four-wheel drive vehicle, the vehicle body speed estimation method comprising:
    acquiring an estimated vehicle body speed based on wheel speeds or a longitudinal acceleration of the vehicle;
    determining whether an operation condition that includes at least a condition that the estimated vehicle body speed is higher than an operation determination speed is satisfied;
    performing torque limitation to reduce a torque of a portion of wheels of the vehicle when the operation condition is satisfied;
    determining whether a stop condition that includes a condition that the estimated vehicle body speed is lower than or equal to a stop determination speed or a condition that a duration of a state where a wheel acceleration of the portion of the wheels is higher than zero is longer than or equal to a set period of time;
    stopping the torque limitation when the stop condition is satisfied;
    acquiring a first estimated vehicle body speed based on the wheel speeds;
    calculating a second estimated vehicle body speed based on an integral of a sum of the longitudinal acceleration and an offset;
    determining whether a slip determination condition that includes at least a condition that the first estimated vehicle body speed is higher than the second estimated vehicle body speed is satisfied;
    setting the first estimated vehicle body speed for the estimated vehicle body speed when the slip determination condition is not satisfied; and
    setting the second estimated vehicle body speed for the estimated vehicle body speed when the slip determination condition is not satisfied.

2. The vehicle body speed estimation method according to claim 1, wherein the torque limitation reduces the torque of rear wheels without reducing the torque of front wheels.

3. The vehicle body speed estimation method according to claim 1, wherein the operation determination speed is calculated based on an integral of the longitudinal acceleration.

4. The vehicle body speed estimation method according to claim 1, (Original) wherein the stop determination speed is calculated based on an integral of the longitudinal acceleration.

5. The vehicle body speed estimation method according to claim 4, wherein the stop determination speed is a sum of a set value and a value calculated based on the integral of the longitudinal acceleration.

6. The vehicle body speed estimation method according to claim 1, further comprising determining whether a wheel slip is occurring, wherein
    the operation condition includes at least a condition that the wheel slip is occurring and a condition that the estimated vehicle body speed is higher than the operation determination speed.

7. The vehicle body speed estimation method according to claim 6, wherein the operation condition includes a condition that the wheel slip occurs and a duration of a state where the estimated vehicle body speed is higher than the operation determination speed is longer than or equal to a set period of time.

8. A vehicle body speed estimation method applied to a four-wheel drive vehicle, the vehicle body speed estimation method comprising:
    acquiring an estimated vehicle body speed based on wheel speeds or a longitudinal acceleration of the vehicle;
    determining whether an operation condition that includes at least a condition that the estimated vehicle body speed is higher than an operation determination speed is satisfied;
    performing torque limitation to reduce a torque of a portion of wheels of the vehicle when the operation condition is satisfied;
    determining whether a stop condition that includes a condition that the estimated vehicle body speed is lower than or equal to a stop determination speed or a condition that a duration of a state where a wheel acceleration of the portion of the wheels is higher than zero is longer than or equal to a set period of time;
stopping the torque limitation when the stop condition is satisfied; and
determining whether a wheel slip is occurring;
wherein the operation condition includes at least a condition that the wheel slip is occurring and a condition that the estimated vehicle body speed is higher than the operation determination speed, and
wherein the determining whether the wheel slip is occurring includes:
acquiring a first estimated vehicle body speed based on the wheel speeds;
calculating a second estimated vehicle body speed based on an integral of a sum of the longitudinal acceleration and an offset;
determining whether a slip determination condition that includes at least a condition that the first estimated vehicle body speed is higher than the second estimated vehicle body speed is satisfied; and
determining that the wheel slip is occurring when the slip determination condition is satisfied.

9. A vehicle body speed estimation apparatus applied to a four-wheel drive vehicle, the vehicle body speed estimation apparatus comprising one or plurality of processors, wherein the one or plurality of processors is programmed to:
acquire an estimated vehicle body speed based on wheel speeds or a longitudinal acceleration of the vehicle;
determine whether an operation condition that includes at least a condition that the estimated vehicle body speed is higher than an operation determination speed is satisfied;
perform torque limitation to reduce a torque of a portion of wheels of the vehicle when the operation condition is satisfied;

determine whether a stop condition that includes a condition that the estimated vehicle body speed is lower than or equal to a stop determination speed or a condition that a duration of a state where a wheel acceleration of the portion of the wheels is higher than zero is longer than or equal to a set period of time;
stop the torque limitation when the stop condition is satisfied; and
determine whether a wheel slip is occurring;
wherein the operation condition includes at least a condition that the wheel slip is occurring and a condition that the estimated vehicle body speed is higher than the operation determination speed, and
wherein the one or plurality of processors is further programmed to:
acquire a first estimated vehicle body speed based on the wheel speeds;
calculate a second estimated vehicle body speed based on an integral of a sum of the longitudinal acceleration and an offset;
determine whether a slip determination condition that includes at least a condition that the first estimated vehicle body speed is higher than the second estimated vehicle body speed is satisfied; and
determine that the wheel slip is occurring when the slip determination condition is satisfied.

10. The vehicle body speed estimation apparatus according to claim 9, wherein the operation condition includes a condition that the wheel slip occurs and a duration of a state where the estimated vehicle body speed is higher than the operation determination speed is longer than a set period of time.

* * * * *